United States Patent
Chaskar et al.

(10) Patent No.: US 6,654,811 B1
(45) Date of Patent: Nov. 25, 2003

(54) BACKPRESSURE ARRANGEMENT IN CLIENT-SERVER ENVIRONMENT

(75) Inventors: Hemant M. Chaskar, Woburn, MA (US); Rayadurgam Ravikanth, Waltham, MA (US); Inas Said, Billerica, MA (US); Pasi Vaananen, Somerville, MA (US); Eleftherios Dimitrou, Woburn, MA (US); Mikko Turkia, Cambridge, MA (US)

(73) Assignee: Nokia Inc., Burlington, MA (US)

( * ) Notice: Subject to any disclaimer, the term of this patent is extended or adjusted under 35 U.S.C. 154(b) by 0 days.

(21) Appl. No.: 09/549,231

(22) Filed: Apr. 13, 2000

(51) Int. Cl.$^7$ ................................................ G06F 15/16
(52) U.S. Cl. ........................................ 709/236; 370/230
(58) Field of Search ................................. 709/200, 201, 709/203, 206, 207, 217, 218, 219, 231, 232, 233, 234, 236

(56) References Cited

U.S. PATENT DOCUMENTS

| | | | | |
|---|---|---|---|---|
| 5,519,701 A | * | 5/1996 | Colmant et al. | 370/412 |
| 5,568,470 A | * | 10/1996 | Ben-Nun et al. | 370/238 |
| 6,067,300 A | * | 5/2000 | Baumert et al. | 370/413 |
| 6,067,301 A | * | 5/2000 | Aatresh | 370/418 |
| 6,094,435 A | * | 7/2000 | Hoffman et al. | 370/414 |
| 6,151,644 A | * | 11/2000 | Wu | 710/52 |
| 6,201,789 B1 | * | 3/2001 | Witkowski et al. | 370/230 |
| 6,246,680 B1 | * | 6/2001 | Muller et al. | 370/389 |
| 6,259,698 B1 | * | 7/2001 | Shin et al. | 370/395.7 |
| 6,363,075 B1 | * | 3/2002 | Huang et al. | 370/412 |

FOREIGN PATENT DOCUMENTS

| | | |
|---|---|---|
| EP | 763915 | 3/1997 |
| GB | 2328593 | 2/1999 |
| WO | 9935879 | 7/1999 |

OTHER PUBLICATIONS

"Expandable ATOM Switch Architecture (XATOM)for ATM LANs", By R. Fan, et al. Pub. date Jan. 5, 1994.

* cited by examiner

Primary Examiner—Glenton B. Burgess
Assistant Examiner—Mareisha N. Winters
(74) Attorney, Agent, or Firm—Antonelli, Terry, Stout & Kraus, LLP

(57) ABSTRACT

A line interface card apparatus includes: a packet queue memory for storing packets; a physical layer having first and second buffers, the physical layer being connected to the packet queue memory by a data bus and being connected to a plurality of links; and a queue manager connected to the packet queue memory and to the physical layer by a control bus. Upon one of the plurality of links transmitting a request for data packets to the physical layer, the physical layer transmits the request via the control bus to the queue manager; the queue manager instructs the packet queue memory to transmit requested data packets to the physical layer via the data bus; each data packet is transmitted from the packet queue memory to the physical layer in one or more packet fragments which are stored in one of the first and second buffers, and upon all of the one or more packet fragments of one data packet being stored in one of the first and second buffers, the data packet is transmitted to the link transmitting the request for data packets.

38 Claims, 3 Drawing Sheets

BACKPRESSURE ARRANGEMENT IN CLIENT-SERVER ENVIRONMENT

BACKGROUND OF THE INVENTION

1. Field of the Invention

The present invention relates to a client-server environment and more particularly, the present invention relates to a backpressure arrangement in a client-server environment which optimizes the transfer of data between the server and the clients.

2. Description of the Related Art

In a typical client-server environment, a number of clients are connected to the server via a shared data bus. The clients generate requests for data on a control bus and the server responds to these requests by sending data units to the corresponding clients on the shared data bus.

The server keeps a pool of data units (that is, data packets) for each client. This pool may consist of a number of queues storing packets from different flows destined for the same client. The size of any data unit can be arbitrary, but must always be greater than a certain minimum value.

SUMMARY OF THE INVENTION

The object of the present invention is to optimize the transfer of data between the server and the clients so as to keep all clients occupied at all times without causing buffers disposed between the clients and the server from overflowing.

The above-noted object may be effected by providing a line interface card apparatus including: a packet queue memory for storing pools of data packets for different clients; a physical layer having first and second buffers, said physical layer being connected to said packet queue memory by a data bus and being connected to a plurality of links for continuously transmitting data, subject to availability, from the physical layer buffers; a queue manager connected to said packet queue memory and to said physical layer by a control bus; wherein, upon the said physical layer transmitting a request for data to be transmitted on a certain link to said queue manager on said control bus, said queue manager instructs a packet pool corresponding to that link in said packet queue memory to transmit a next data block to said physical layer via said data bus, each data packet in said packet queue memory being transmitted from said packet queue memory to said physical layer in one or more packet fragments upon successive requests for data from a link to which that data packet is destined; and the packet fragments being stored in one of said first and second buffers.

Each of the first and second buffers is sufficiently large enough to store the largest packet fragment and the packet fragment minimum size is equal to the data packet minimum size.

A speed-up factor for the data bus may be equal to a ratio of a maximum fragment length to a minimum fragment length to keep all of said plurality of links busy at all times.

Said plurality of links may be arranged into a plurality of classes, each of said classes including only links having similar transmission speeds, and wherein each of said classes is assigned a priority according to said transmission speed of its respective links, a class having links having a highest transmission speed being assigned a highest priority down to a class having links having a lowest transmission speed being assigned a lowest priority and wherein the queue manager process requests in a strict priority order starting with links from the class having the highest priority down to links from the class having the lowest priority.

BRIEF DESCRIPTION OF THE DRAWING FIGURES

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims. The following represents brief descriptions of the drawings, wherein:

DETAILED DESCRIPTION OF THE INVENTION

Figure 1:
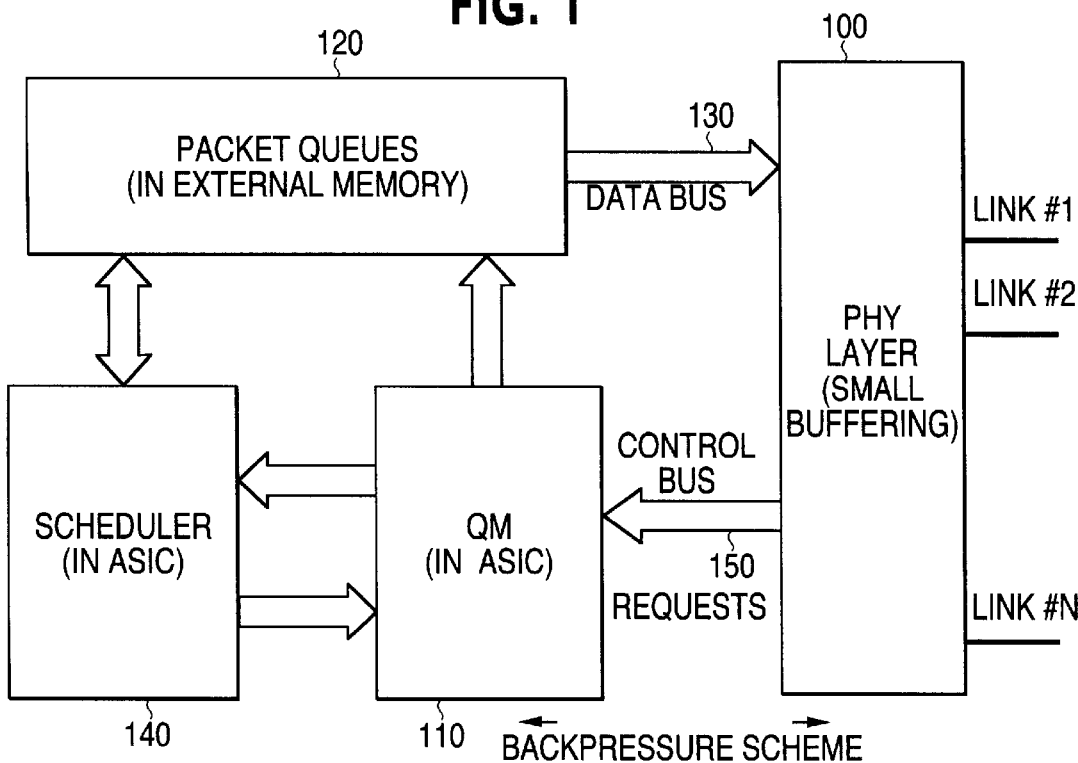
FIG. 1 is a block diagram of a line interface unit card.

Before beginning a detailed description of the subject invention, mention of the following is in order. When appropriate, like reference numerals and characters may be used to designate identical, corresponding, or similar components in differing drawing figures. Furthermore, in the detailed description to follow, sizes/models/values/ranges may be given, although the present invention is not limited thereto. It is noted that the present invention is not limited to being implemented by hardware or by software but rather may be implemented by either hardware or software or any combination thereof. Furthermore, well-known power connections to the components have not been shown within the drawing figures for simplicity of illustration and discussion and so as not to obscure the present invention.

Although example embodiments of the present invention are described below in an environment in which Internet Protocol(IP) packets are transmitted between a server and a plurality of clients, the present invention is not specifically limited to such an environment.

A "backpressure scheme" refers to the protocol employed between the physical layer (PHY layer) and the queue manager (QM) of a line interface unit (LIU) card. FIG. 1 is a block diagram of a line interface unit card. The physical layer 100 is in interface between the queue manager 110 and a plurality of transmission links (Link #1, Link #2, . . . Link #N). The physical layer 100 has only a limited buffering capability. That is, it can only store a limited amount of data to be transmitted on the links. The queue manager 110 has pointers to packets stored in a memory 120 that have been scheduled for transmission on different links. There is one pointer for each link. The physical layer 100 generates requests for data to be transmitted on the links. The queue manager 110 processes these requests sequentially. In response to a given request, the queue manager 110 transfers a packet or a part of the packet (that is, a packet fragment) scheduled for that link from the memory 120 to the physical layer 100 on the shared data bus 130. If the queue manager 110 does not have a pointer to the packet for that link, it sends a request to the scheduler 140 which in turn provides the queue manager 110 with the pointer to the new packet for that link.

Since different output links can have different transmission speeds (the actual values depending on the chosen configuration of the line interface unit), their respective physical layers must be supplied with data at different rates. For this reason, it is necessary to have a systematic technique for the generation of requests at the physical layer and for the queuing and processing of these requests by the queue manager.

The packets that the queue manager points to (that is, the packets that have been scheduled for transmission), may have variable sizes. For example, an Internet Protocol(IP) packet can have a size anywhere in the range of 40 bytes to 9000 bytes. Because of this, data transactions from the memory to the physical layer also tend to be in variable size data units. This requires the data bus to operate at a speed that is higher than the desired data throughput speed. Ideally, it is desirable to design a backpressure scheme that provides good performance with a small speed-up factor.

The following example illustrates the necessity of speed-up. Consider the case in which the data throughput is equal to 2.5 Gbits/s and two output links each have a transmission speed of 1.25 Gbits/s and an internal data bus has a speed of 2.5 Gbits (that is, no speed-up). In such a case, it takes 0.128 microseconds and 28.8 microseconds, respectively, to transfer 40 byte and 9000 byte Internet Protocol (IP) packets from the packet queue memory to the physical layer. Their transmission times on the 1.25 Gbits/s link are 0.256 microseconds and 57.6 microseconds, respectively. For this example, assume that the data transactions from the packet queue memory to the physical layer are performed in units of complete Internet protocol packets and assume that the queue manager grants the 40 byte packet to link one and grants the 9000 byte packet to link two. In such a case, the 40 byte packet is transmitted on link one in 0.256 microseconds while it takes 28.8 microseconds to transfer the 9000 byte packet to link two on the data bus. Hence, link one must wait for (28.8–0.256)=28.544 microseconds before its request for the next data unit can be granted. This causes severe underutilization of link one. This underutilization can be avoided if the data bus is operated at a speed which is faster than the desired data throughput, that is, if the appropriate speed-up is employed.

One feature of the present invention is to employ fragment-based data transactions between the queue manager and the physical layer rather than packet-based data transactions between the queue manager and the physical layer as in earlier arrangements. The use of fragment-based data transactions allows the buffers in the physical layer to be smaller than those needed with packet-based data transactions. Furthermore, the use of small fragments allows for better delay characteristics. For example, a small packet of 40 bytes which fits in one fragment and is intended for one link, need not wait for the complete transfer from the packet queue memory to the physical layer of a large packet, for example-a 9000 byte packet, intended for another link. A fragment-based transaction also facilitates a lower speed-up factor. Note that the data transactions from the input to the output of the line interface unit in accordance with the present invention are still packet-based.

Another feature of the present invention is an efficient technique to buffer the fragments at the physical layer and to generate requests for new fragments at the physical layer.

Still another feature of the present invention is to process the requests generated by the physical layer in the queue manager in a prioritized manner rather than in a simple first-in-first-out manner as in earlier arrangements. In the present invention, the priority of any request depends on the speed of the link that it corresponds to.

In more detail, FIG. 1 is a block diagram of a line interface card unit. The queue manager 110 is connected to the scheduler 140. In the block diagram, the queue manager 110 and the scheduler 140 are shown as being contained in an ASIC (application-specific integrated circuit). It is to be understood, however, that the queue manager 110 and the scheduler 140 may of course be implemented by one or more integrated circuits or, under certain circumstances, may be implemented by software programmed in a processor.

Both the queue manager 110 and the scheduler 140 are connected to an "external memory" having the packet queues 120 stored therein. The term "external memory" merely refers to the fact that the memory is external to the ASIC. In fact, the memory 120 storing the packet queues may be any memory although normally the memory 120 would be physically located near the queue manager 110 and scheduler 120 to minimize the wiring. The three elements could even be on the same integrated circuit.

The physical layer 100 is connected to the packet queue memory 120 via the data bus 130 and is connected to the queue manager 110 via the control bus 150. Link #1–link #N transmit requests to the queue manager 110 via the physical layer 100 and control bus 150 and receive the requested data from the packet queue memory 120 via the data bus 130 and the physical layer 100.

In the present invention, the physical layer 100 requests data from the queue manager 110 so as to keep the links busy at all times. The physical layer 100 achieves this by having two buffers, each buffer being large enough to accommodate the largest fragment for every link. The fragment referred to is the fragment transferred between the queue manager 110 and the physical layer 100 via the packet queue memory 120 and the data bus 130. When the physical layer 100 starts the transmission of a given fragment, it generates a request for a new fragment which is transmitted to the queue manager 110 via the control bus 150. The physical layer 100 does not generate a new request prior to the currently pending request being granted.

Figure 2:
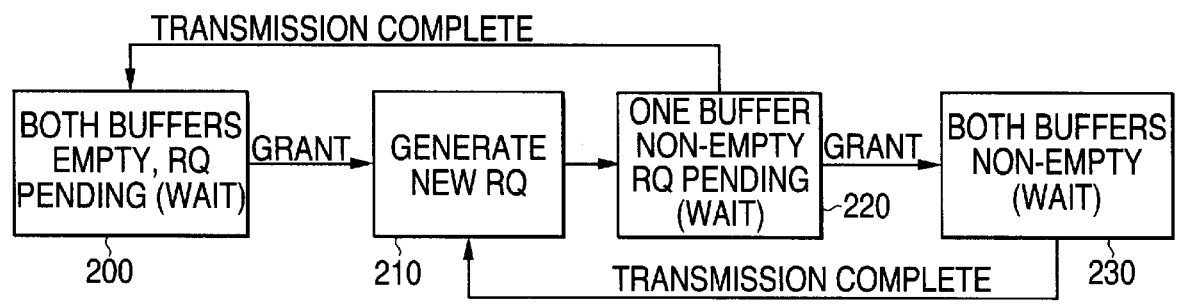
FIG. 2 illustrates a state machine for the generation of requests at the physical layer.

FIG. 2 illustrates a state machine for the generation of requests at the physical layer. Note that it is a state machine for a single link. The state machines for different links are running in parallel. The physical layer stores the requests generated by different state machines and sends them sequentially to the queue manager in a prioritized manner.

As illustrated in FIG. 2, there are four states for the physical layer for a particular link, namely, the state in which both buffers are empty (and a request is pending) 200, the state in which a new request is generated 210, the state in which one buffer is non-empty and a request is pending 220, and the state in which both buffers are non-empty 230. When the physical layer is in the state 200 and both buffers are empty, the physical layer waits for the previously transmitted request to be granted. Upon the request being granted, in state 210, a new request is generated and forwarded to the queue manager 110 via the control bus 150. The physical layer then proceeds to the state 220 in which one buffer is not empty (from the request granted that caused a transition to state 210) and in which the physical layer is awaiting the grant of the request generated in state 210. If the request is granted before the completion of transmission of the fragment in state 220, the physical layer proceeds to state 230 in which both buffers are filled. Otherwise, it proceeds to state 200. Upon the transmission of the data via the link in state 230, the physical layer proceeds to state 210.

This way of buffering fragments and request generation, along with the other features of the present invention which will be discussed below, ensures that no link is ever starved and that no physical layer buffer ever overflows.

The queue manager 110 processes the requests generated by the physical layer 100 and delivers fragments to the respective links. The ability of the backpressure scheme to keep the links busy at all times depends on the order in which the queue manager 110 processes the pending requests and the speed at which the fragments are transferred from the packet queue memory to the physical layer.

Figure 3:
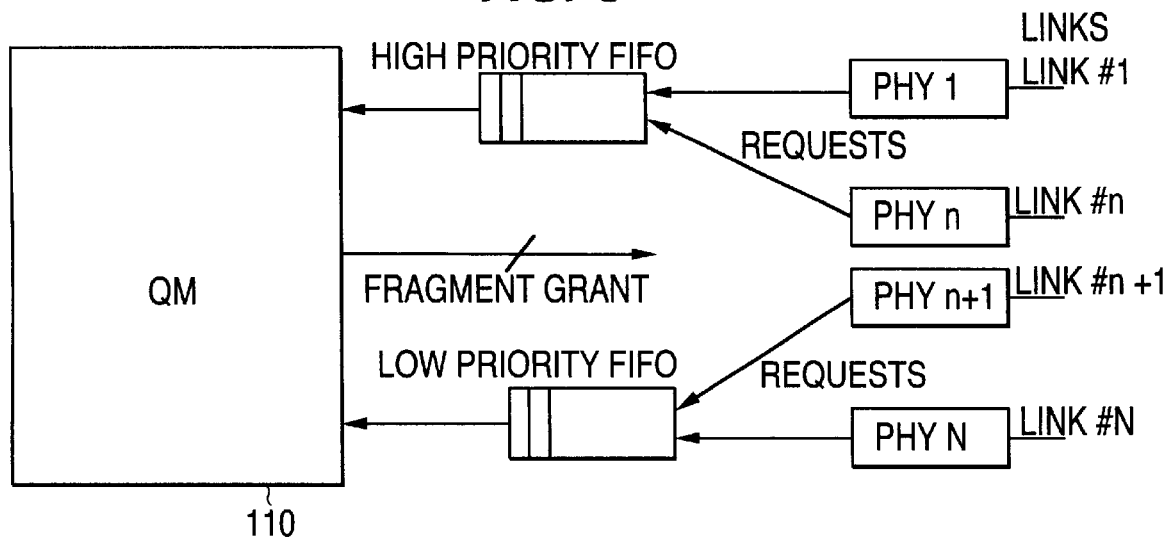
FIG. 3 illustrates the queuing and processing of requests generated by the physical layer.

In the present invention, all of the links having similar speeds are grouped together as a class. The class of links having higher speeds have a higher priority than the class of links having lower speeds. A request FIFO (first-in-first-out) queue is associated with each class. The queue manager 110 serves these FIFO queues in strict priority order. FIG. 3 illustrates the queuing and processing of requests generated by the physical layer 100 for the case of two classes of links.

As shown in FIG. 3, link #1 to link #n are of a higher speed than a link #(n+1) to link N and accordingly, requests from the former class of links go to a high-priority FIFO queue whereas requests from the latter class of links go to a low-priority FIFO queue.

In practice, there will usually be only be a few different classes of links. Thus, although the total number of links may be large, the number of FIFO queues will be small and the task of maintaining priorities will be simple. This is important in that in practice, there may be a few hundred thousand links and the data throughput can be very high, e.g., on the order of a few Gbits/s.

The internal speed-up factor depends on the ratio of the maximum to minimum fragment size. If the packets are of an arbitrary length, the fundamentally smallest value that can be achieved with no fragmentation for this ratio is Lmax/Lmin. When fragmentation is employed, it is mathematically provable that with packets of variable sizes, the smallest speed-up factor that achieves the goal of the backpressure scheme perfectly is the lesser of Lmax/Lmin and 2. It is also provable that the proposed architecture for the backpressure scheme provides a perfect operation with the speed-up factor of 2. If a speed-up factor of less than 2 is used in the proposed solution, the performance is sub-optimal and the degree of performance degradation will depend on the exact link configuration. In simulation experiments performed with speed-up factors lower than 2, it has been observed that a smaller speed-up factor, for example, 1.3, is usually sufficient in practice. This is due to the fact that the mathematical argument is based on the worst-case scenario while in practice, the worst-case scenario usually does not occur all the time.

In practice, on the Internet, since the smallest packets have a size of 40 bytes (the size of an Internet Protocol (IP) header), one can limit the fragment sizes to the range of between 40 and 79 bytes, thereby achieving the smallest possible speed-up factor.

However, with present-day elements, memory elements are in increments that are multiples of 2. Since the multiple of 2 that lies in the range 40–79 is 64, one memory block should correspond to 64 bytes. Each such block requires an identification header. Let h bytes be the size of such a header. This leaves (64-h) bytes for data storage in each memory block. Accordingly, for efficient memory utilization, it would be desirable to divide a large packet into as many (64-h) bytes fragments as possible before considering fragments of any other size.

In view of the above, a packet having P bytes should be segmented into x 40 byte fragments, y (64-h) byte fragments (as many as possible), and at most one d byte fragment (40<d<79), such that:

$$P = 40x + (64-h)y + d \qquad \text{Equation (1)}$$

Recall that no fragment can be smaller than 40 bytes and bigger than 79 bytes.

For example with h=4, if P=81, then x equals 1, y equal zero, and d equals 41. If P=119, then x equals zero, y equals 1, and d equals 59 (and not x equals 1 and d equals 79). If P=150, then x equals 1, y equals 1 and d equals 50. If P=500, x equals 2 and y equals 7, etc.

As noted above, the queue manager 110 processes the requests generated by different links and delivers the fragments to the respective links. The ability of the backpressure scheme to keep the links busy at all times depends on the order and speed at which the queue manager 110 processes the pending requests. As will be first shown below, simple (that is, non-prioritized) processing of the pending requests does not suffice to achieve the goal of full link utilization at practical values of internal speed-up factors. Therefore, prioritized processing of the pending requests is needed.

Figure 4:
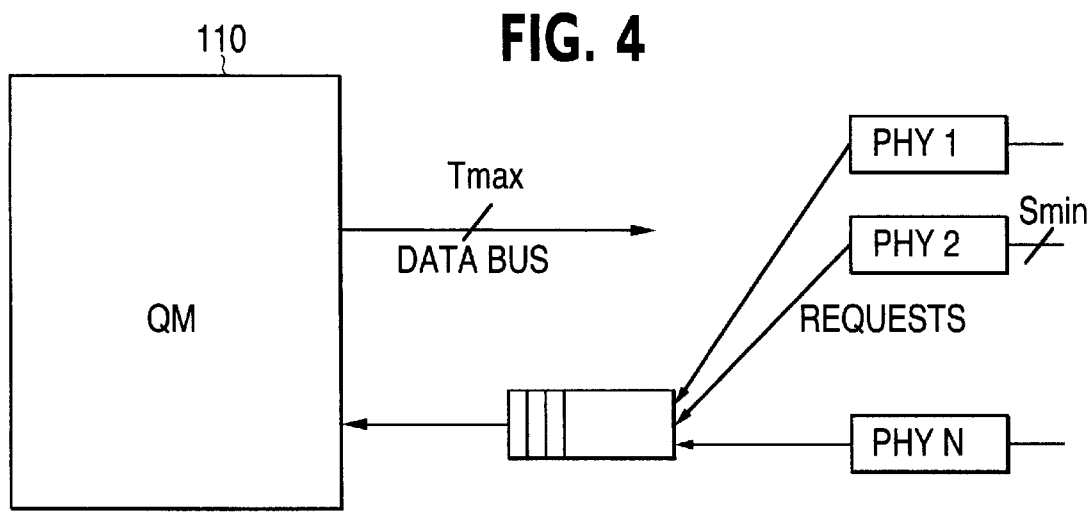
FIG. 4 illustrates non-prioritized queuing of pending requests.

FIG. 4 illustrates non-prioritized queuing of pending requests. In this scheme, requests for fragments which are generated by different links are processed on a first-come-first-served non-prioritized basis. In order to prevent link idleness, the request for a new fragment must be granted before the physical layer of that link finishes the transmission of the fragment that started at the time of the request generation. Since at any given time, at most one request of any link can be pending, the maximum size of the request FIFO queue is N, where N is the total number of links. This results in the following sufficient condition to insure that the links are never starved:

$$N \times T\text{max} \leq S\text{min} \qquad \text{Equation (2)}$$

Tmax denotes the maximum processing time for any request and Smin denotes the transmission time for the smallest fragment on the fastest link. Tmax essentially corresponds to the time required to transfer a maximum size fragment from the packet queue memory 120 to the physical layer 100 on data bus 130.

The following is an example of the speed-up factor with non-prioritized FIFO request processing:

Assume that there are 32,000 links, each of a transmission speed of 64 Kbits/s (DS0). Thus, the desired data throughput between the queue manager and the physical layer is 32,000 multiplied by 64 Kbits/s which is equal to 2.048 Gbits/s. Assume that the maximum fragments size is 79 bytes and the minimum fragment size is 40 bytes (as given in Equation (1)). Also assume that there is no speed-up employed, that is, the speed of the data bus 130 is same as the desired data throughput between the queue manager 110 and the physical layer 100 which is 2.048 Gbits/s. Then, $$T\text{max} = (79 \times 8)/(2.048 \times 10^9) = 308.59 \text{ ns}.$$

This is the time required to transfer 79 bytes from the queue manager 110 to the physical layer 100 at 2.048 Gbits/s.

$$S\text{min} = (40 \times 8)/(64 \times 10^3) = 5 \text{ ms}.$$

This is the transmission time of a 40 byte fragments on the link.

Thus, $N \times Tmax = 32 \times 10^3 \times 308.59 \times 10^{-9} = 9.875$ ms.

It can be seen that the sufficient condition is not satisfied with the internal throughput of 2.048 Gbits/s and accordingly, an internal speed-up is required. If the speed-up is employed such that the internal throughput from the queue manager 110 to the physical layer 100 becomes 4.096 Gbits/s, then the sufficient condition is met and the links will be fully utilized. With such a speed up, $Tmax=154.29$ ns, and $N \times Tmax=4.9375$. Thus, for this configuration, a speed-up of 2 is sufficient.

The following is another example of the speed-up factor with non-prioritized FIFO request processing:

Assume 16,000 links, each having a speed of 64 Kbits/s and one link with a speed of 1.024 Gbits/s. As above, assume that the smallest fragment is 40 bytes and the largest fragment is 79 bytes. Using a similar calculation as with the example above, this configuration requires a speed up of about 16,000 to prevent link idleness.

In summary, when non-prioritized FIFO request processing is employed, different speed-up factors are required for different link configurations. This seriously restricts the configurability of a line interface unit card. Further, impracticably high (and hence, impossible to implement at high data throughput) speed-up factors are required for certain link configurations. These shortcomings can be remedied by using prioritized processing as described below.

Figure 5:
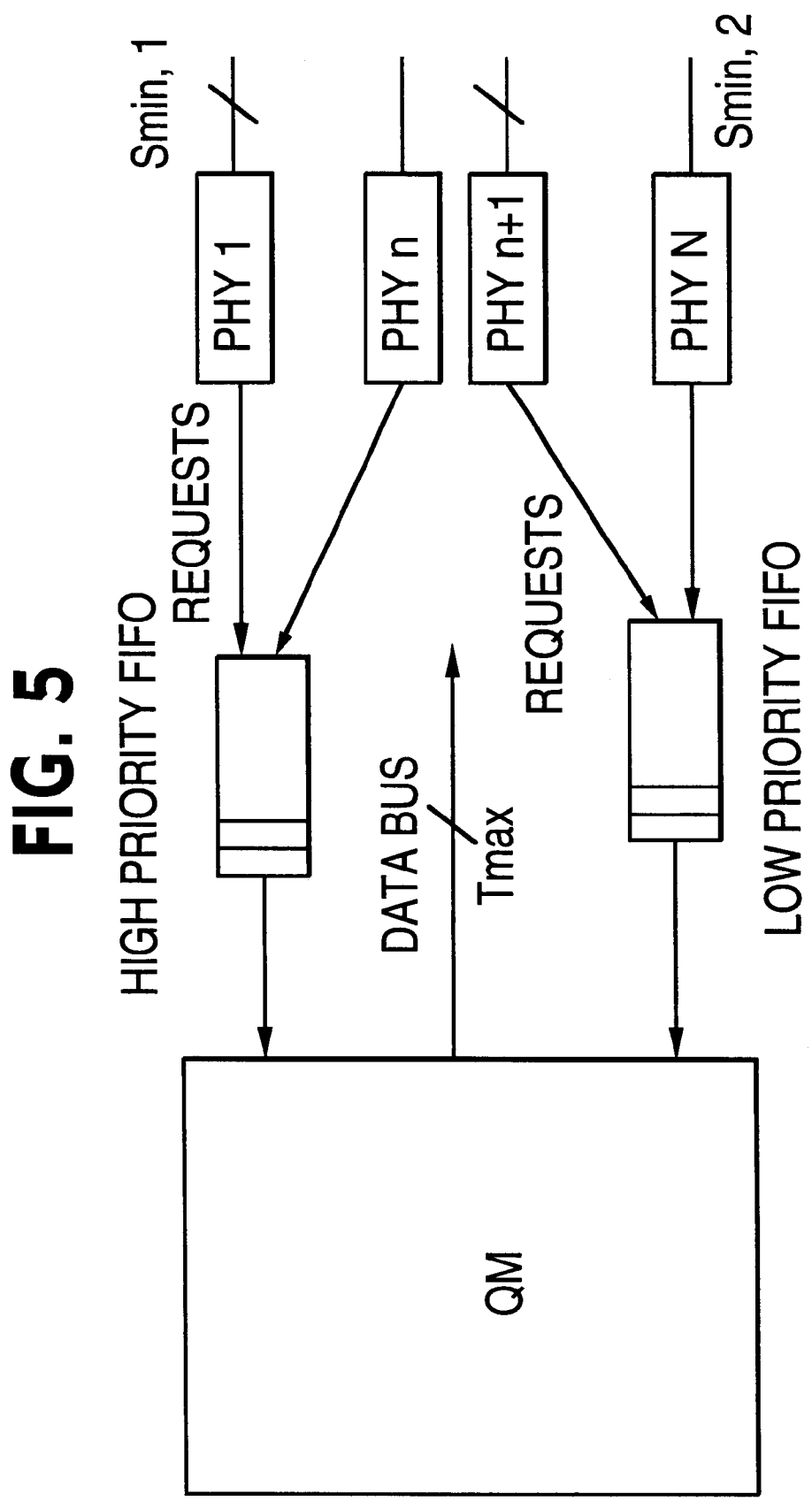
FIG. 5 illustrates prioritized queuing of pending requests.

FIG. 5 illustrates prioritized queuing of pending requests. In this arrangement, all of the links having the same speed are grouped together as a class. The class of links having a higher speed has a higher priority than the class of links having a lower speed. A request FIFO queue is associated with each class and the queue manager 110 serves these FIFO queues in strict priority. FIG. 5 illustrates the case for two classes of links. Assuming that there are K classes of links with class k containing $N_k$ links, each of speed $R_k$. Hence, the desired data throughput from the queue manager to the physical layer is $R = r1N1 + r2N2 + \ldots + rKNK$. Let Smink be the transmission time of the smallest fragment on the link of class k. Then the following condition is sufficient to prevent link idleness:

$$\{(N1/Smin1) + (N2/Smin2) + \ldots + (NK/SminK)\} \leq 1/Tmax \quad \text{Equation (3)}$$

Now assuming that the maximum fragment size is Lmax and the minimum fragment size Lmin, we have:

$$Smink/Tmax = (Lmin/Rk)/(Lmax/C) \text{ for all } k. \quad \text{Equation (4)}$$

Here C is the speed of data bus 130.

Hence, if:

$$C \stackrel{\geq}{=} (Lmax/Lmin) \times (r1N1 + r2N2 + \ldots + rKNK) = (Lmax/Lmin) \times R,$$

then the sufficient condition is met, thereby ensuring full link utilization. Thus, Lmax/Lmin is precisely the internal speed-up factor required so as to keep the links busy at all times. Note that this speed-up factor is independent of the actual link configuration.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A line interface card apparatus comprising:
    a data bus;
    a control bus;
    a packet queue memory for storing a plurality of data packets;
    a physical layer having first and second buffers, said physical layer being connected to said packet queue memory by said data bus and being adapted to be connected to a plurality of links to transmit data from said first and second physical layer buffers on the links;
    a queue manager connected to said packet queue memory and to said physical layer by said control bus;
    wherein, said queue manager is responsive to said physical layer transmitting to said queue manager via said control bus, a request for a first particular data packet, by instructing said packet queue memory to transfer the first particular data packet to said physical layer via said data bus, the first particular data packet being transferred from said packet queue memory to said physical layer in one or more packet fragments, the packet fragments being stored in one of said first and second buffers for transmission on the certain link, and upon the last fragment of the first particular data packet being transferred to the certain link said queue manager locates a new packet to be transferred to a link in response to a further request.

2. The apparatus of claim 1, wherein each of said first and second buffers is sufficiently large enough to store the largest data fragment to be requested.

3. The apparatus of claim 2, wherein said packet fragment minimum size is equal to said data packet minimum size.

4. The apparatus of claim 2, wherein a speed-up factor between said queue manager and said physical layer is equal to a ratio of a maximum fragment length to a minimum fragment length to keep all of said plurality of links busy at all times.

5. The apparatus of claim 2, further comprising a scheduler connected to said queue manager and said packet queue memory, said scheduler providing a pointer to said queue memory upon a request for the pointer from said queue memory.

6. The apparatus of claim 1, wherein said packet fragment minimum size is equal to said data packet minimum size.

7. The apparatus of claim 6, wherein a speed-up factor between said queue manager and said physical layer is equal to a ratio of a maximum fragment length to a minimum fragment length to keep all of said plurality of links busy at all times.

8. The apparatus of claim 6, further comprising a scheduler connected to said queue manager and said packet queue memory, said scheduler providing a pointer to said queue memory upon a request for the pointer from said queue memory.

9. The apparatus of claim 1, wherein a speed-up factor for said data bus between said packet queue memory and said physical layer is optimally equal to a ratio of a maximum fragment length to a minimum fragment length to keep all of said plurality of links busy at all times.

10. The apparatus of claim 9, further comprising a scheduler connected to said queue manager and said packet queue memory, said scheduler providing a pointer to said queue memory upon a request for the pointer from said queue memory.

11. The apparatus of claim 1, wherein said plurality of links are arranged into a plurality of classes, each of said classes including only links having similar transmission speeds, and wherein each of said classes is assigned a priority according to the transmission speeds, and wherein each of said classes is a class having links having a highest transmission speed being assigned a highest priority down to a class having links having a lowest transmission speed being assigned a lowest priority, and wherein said queue manager processes requests in a strict priority order starting with links from the class having the highest priority down to links from the class having the lowest priority.

12. The apparatus of claim 1, further comprising a scheduler connected to said queue manager and said packet queue memory, said scheduler providing a pointer to said queue memory upon a request for the pointer from said queue manager.

13. A method of operating a line interface cardincluding a packet queue memory for storing packets; a physical layer having first and second buffers, the physical layer being connected to the packet queue memory by a data bus and being connected to a plurality of links; and a queue manager connected to the packet queue memory and to the physical layer by a control bus; the method comprising:
when at least one physical layer buffer is empty, generating a request for a particular data packet;
transmitting the request from the physical layer to the queue manager via the control bus;
activating the queue manger, to instruct the packet queue memory to transmit the particular data packet to the physical layer via the data bus;
segmenting the particular data packet into fragments;
transmitting the particular data packet from the packet queue memory to the physical layer in one or more packet fragments on successive requests; and
storing the transmitted packet fragments in one of the first and second buffers.

14. The method of claim 13, wherein each of said first and second buffers is sufficiently large to store the largest data fragment.

15. The method of claim 14, wherein said packet fragment minimum size is equal to said data packet minimum size.

16. The method of claim 14, wherein a speed-up factor between said queue manager and said physical layer is equal to a ratio of a maximum fragment length to a minimum fragment length to keep all of said plurality of links busy at all times.

17. The method of claim 14, further comprising providing a pointer from a scheduler to the queue manager, and using the pointer to instruct the queue memory.

18. The method of claim 13, wherein said packet fragment minimum size is equal to said data packet minimum size.

19. The method of claim 18, wherein a speed-up factor between said queue manager and said physical layer is equal to a ratio of a maximum fragment length to a minimum fragment length to keep all of said plurality of links busy at all times.

20. The method of claim 18, further comprising providing a pointer from a scheduler to the queue manager, and using the pointer to instruct the queue memory.

21. The method of claim 13, wherein a speed-up factor between said queue manager and said physical layer is equal to a ratio of a maximum fragment length to a minimum fragment length to keep all of said plurality of links busy at all times.

22. The method of claim 21, further comprising providing a pointer from a scheduler to the queue manager, and using the pointer to instruct the queue memory.

23. The method of claim 13, wherein said plurality of links are arranged into a plurality of classes, each of the classes including only links having identical transmissionspeeds, and wherein each of the classes is assigned a priority according to the transmission speed of its respective links, a class having links having a highest transmission speed being assigned a highest priority down to a class having links having a lowest transmission speed being assigned a lowest priority, and wherein the queue manager processes requests in a strict priority order starting with links from the class having the highest priority down to links from the class having the lowest priority.

24. The method of claim 13, further comprising providing a pointer from a scheduler to the queue manger, and using the pointer to instruct the queue memory.

25. The method of claim 13, further comprising transmitting the stored data packet fragments on a link.

26. A method of transmitting data packets from a server to a plurality of clients over a shared data bus, the method comprising:
transmitting a request for a particular data packet from one of the clients to a physical layer of the server via a control bus;
transmitting the request from the physical layer to a queue manager of the server;
activating the queue manager to instruct a packet queue memory of the server to transmit the particular data packet to the physical layer;
transmitting the particular data packet from the packet queue memory to the physical layer in one or more packet fragments; and
storing the transmitted packet fragments in one of first and second buffers of the physical layer.

27. The method of claim 26, wherein each of said first and second buffers is sufficiently large to store the largest data fragment.

28. The method of claim 27, wherein said packet fragment minimum size is equal to said data packet minimum size.

29. The method of claim 27, wherein a speed-up factor between said queue manager and said physical layer is equal to a ratio of a maximum fragment length to a minimum fragment length to keep all of said plurality of links busy at all times.

30. The method of claim 27, further comprising providing a pointer from a scheduler to the queue manager, and using the pointer to instruct the queue manager.

31. The method of claim 26, wherein said packet fragment minimum size is equal to said data packet minimum size.

32. The method of claim 31, wherein a speed-up factor between said queue manager and said physical layer is equal to a ratio of a maximum fragment length to a minimum fragment length to keep all of said plurality of links busy at all times.

33. The method of claim 31, further comprising providing a pointer from a scheduler to the queue manager, and using the pointer to instruct the queue manager.

34. The method of claim 26, wherein a speed-up factor between said queue manager and said physical layer is equal to a ratio of a maximum fragment length to a minimum fragment length to keep all of said plurality of links busy at all times.

35. The method of claim 34, further comprising providing a pointer from a scheduler to the queue manager, and using the pointer to instruct the queue manager.

36. The method of claim 26, wherein said plurality of links are arranged into a plurality of classes, each of the classes including only links having similar transmission speeds, and wherein each of the classes is assigned a priority according to the transmission speed of its respective links, a class having links having a highest transmission speed being assigned a highest priority down to a class having links having a lowest transmission speed being assigned a lowest priority, and wherein the queue manager processes requests in a strict priority order starting with links from the class having the highest priority down to links from the class having the lowest priority.

37. The method of claim 26, further comprising providing a pointer from a scheduler to the queue manager, and using the pointer to instruct the queue manager.

38. The method of claim 26, further comprising transmitting the stored data packet fragments on a link.

* * * * *